Dec. 16, 1969   M. A. KNIGHT   3,484,290
BATTERY WITH MULTI-LAYER ELECTRODES
Filed Aug 2, 1966   2 Sheets-Sheet 1
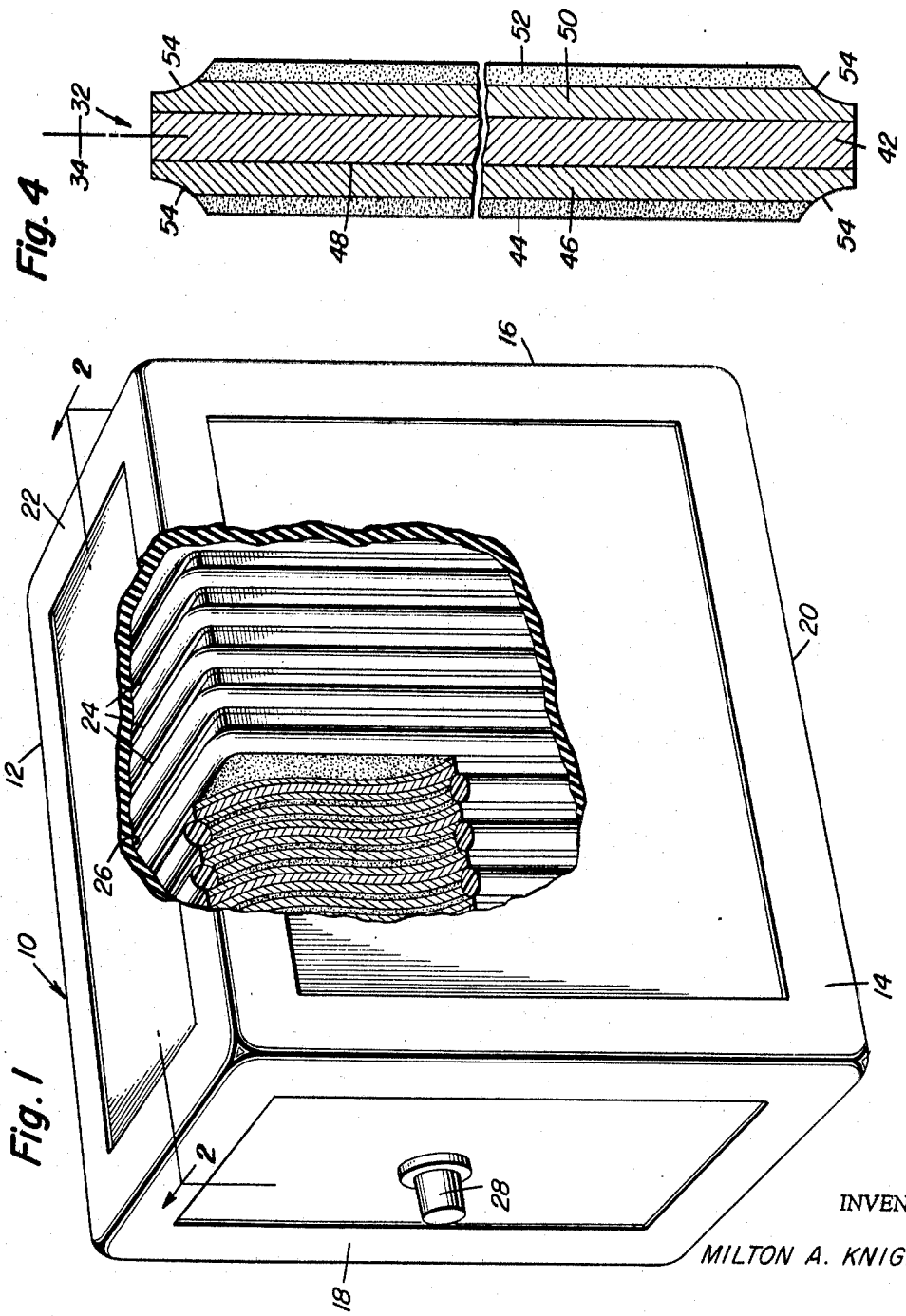
INVENTOR
MILTON A. KNIGHT
BY
ATTORNEY Dec. 16, 1969     M. A. KNIGHT     3,484,290
BATTERY WITH MULTI-LAYER ELECTRODES
Filed Aug 2, 1966     2 Sheets-Sheet 2

INVENTOR
MILTON A. KNIGHT

BY George J. Rubens
ATTORNEY

United States Patent Office 3,484,290
Patented Dec. 16, 1969

3,484,290
BATTERY WITH MULTI-LAYER ELECTRODES
Milton A. Knight, Box 113, R.R. 1,
Centreville, Va. 22020
Filed Aug. 2, 1966, Ser. No. 570,143
Int. Cl. H01m 35/06, 37/00, 3/04
U.S. Cl. 136—6       7 Claims

ABSTRACT OF THE DISCLOSURE

A high output, low weight, low impedance battery including a pair of spaced electrodes and a bibulous spacer disposed therebetween wherein local action, polarization and heat energy dissipation are reduced to a minimum. The space between electrodes is sealed to retain electrolyte in the spacer by means seated in recesses defined by peripheral grooves.

The invention described herein may be manufactured and used by or for the Government of the United States of America for governmental purposes without the payment of any royalties thereon or therefor.

This invention relates generally to batteries, and more particularly to batteries having low resistance electrodes.

One of the most perplexing problems faced by those who are concerned with research and development in the battery art has been that of high internal power losses. These losses are caused by a number of internal battery conditions and vary as to their nature and severity according to the particular type battery structure and materials. Since total battery generating capacity must be sufficient to carry internal as well as external power loads, any reduction in internal load improves overall battery efficiency.

In traditional batteries of the type having externally connected electrodes, generated current must travel from all portions of a current-carrying grid to the point of connection. The length of this travel in addition to a concentration of all electrode current in the grid area immediately adjacent the point of external connection has resulted in very high power losses, these losses being a function of the square of current concentration.

Searcing for practical ways to overcome the current travel problem, battery researchers developed the concept of a bipolar electrode. This concept allows an anodic electrode of one battery cell to be electrically connected directly to the cathodic electrode of the next adjacent battery cell by means of a plate or grid thus eliminating the need for any other current conductor. Although known bipolar electrode structures have materially reduced internal battery power losses, they have not proved entirely satisfactory in that they have not overcome the power dissipating problems of "local action" and current concentration.

Local action, an electrolysis resulting from the exposure of electrochemically dissimilar materials to an electrolyte, occurs whether the external battery circuit is open or closed, causes a wasting of battery power by self-discharge and reduces the operational capacity of the electrodes. There are three basic causes of local action in conventional bipolar electrodes; exposure of grid structure to electrolyte, use of electrode material having electrochemically active material in combination with highly conductive material to obtain the advantages of each, and impurities in the electrochemically active materials. Prior to the instant invention, none was successfully avoided.

Current concentration, the occurrence of uneven rates of current flow across the structure of an electrode causing excessive power losses, has resulted for the most part from the structure of grids used in known bipolar electrodes. Structural requirements and manufacturing limitations have required that certain portions of the grid be placed closer to the surface of the electrode than other portions thus causing concentrations of current through these less resistant paths. In secondary battery applications, this uneven current dispersion causes uneven deposit of the active materials during charging and discharging, and results in hot spots and internal battery deterioration. It has been attempted to avoid such current concentrations by utilizing a plate rather than a grid to support the active electrode material. This approach, however, has resulted in increased resistance of the electrode structure since, prior to the instant invention, the anodic material plate has been secured to the cathodic material plate structure by highly resistant cement. Thus, elimination of one disadvantage has given rise to another equally as harmful.

The benefits to be gained by overcoming the aforementioned disadvantages and increasing the overall efficiency of a battery are significant for all battery applications. They are particularly valuable, however, when volume and weight are critical design factors such as in the aerospace industry where improvements in battery design which result in increased gravimetric efficiency (the ratio of battery output to weight) or increased volumetric efficiency (the ratio of battery output to volume) have been long sought after.

An object of the present invention, therefore, is the provision of a novel battery structure which reduces internal power losses thus increasing both gravimetric and volumetric efficiency.

Another object is to provide a battery having bipolar electrodes and therefore no requirement for external cell connecting conductors.

A further object of the invention is the provision of a battery having electrodes which virtually eliminate power losses caused by the passage of current from cell to cell.

Still another object is to provide a battery electrode in which dissimilar metals in an electrode are not exposed to electrolyte thus virtually eliminating self-discharge by local action.

Yet another object of the present invention is the provision of a bipolar battery electrode which facilitates a uniform distribution of current across its face area.

A still further object of the present invention is to provide a battery bipolar electrode which does not require cement or the like to secure the elements of the electrode.

According to the present invention, the foregoing and other objects are attained by providing a battery having a novel power generating cell structure wherein is utilized a novel electrode having active electrochemical materials bonded to a substrate layer of the same material and wherein tri-metal substrates are used in bipolar electrodes.

Other objects, advantages and novel features of the invention will become apparent from the following detailed description of the invention when considered in conjunction with the accompanying drawings wherein:

FIG. 1 shows a perspective view, partly in section, of a battery constructed according to the present invention;

FIG. 4 is a section of a bipolar electrode according to the instant invention.

Figure 3:
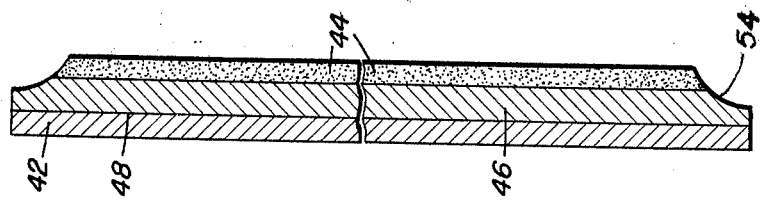
FIG. 3 is a section of a unipolar electrode according to the instant invention.

Referring now to the drawings, wherein like reference characters designate like or corresponding parts throughout the several views, there is shown in FIG. 1 a battery 10 having side walls 12 and 14, end walls 16 and 18, a bottom wall 20 and a top casing wall 22, all formed of a suitable dielectric material. The power generating section of battery 10 comprises a plurality of electrochemical cell sections 24 securely mounted in series in a chamber 26 defined by the battery walls. A cathodic terminal 28 is mounted in casing end wall 18 and electrically connected to the circuit of cell sections 24. Similarly, an anodic terminal 30, also connected to the circuit of cell sections 24, is mounted in casing end wall 16.

Figure 2:
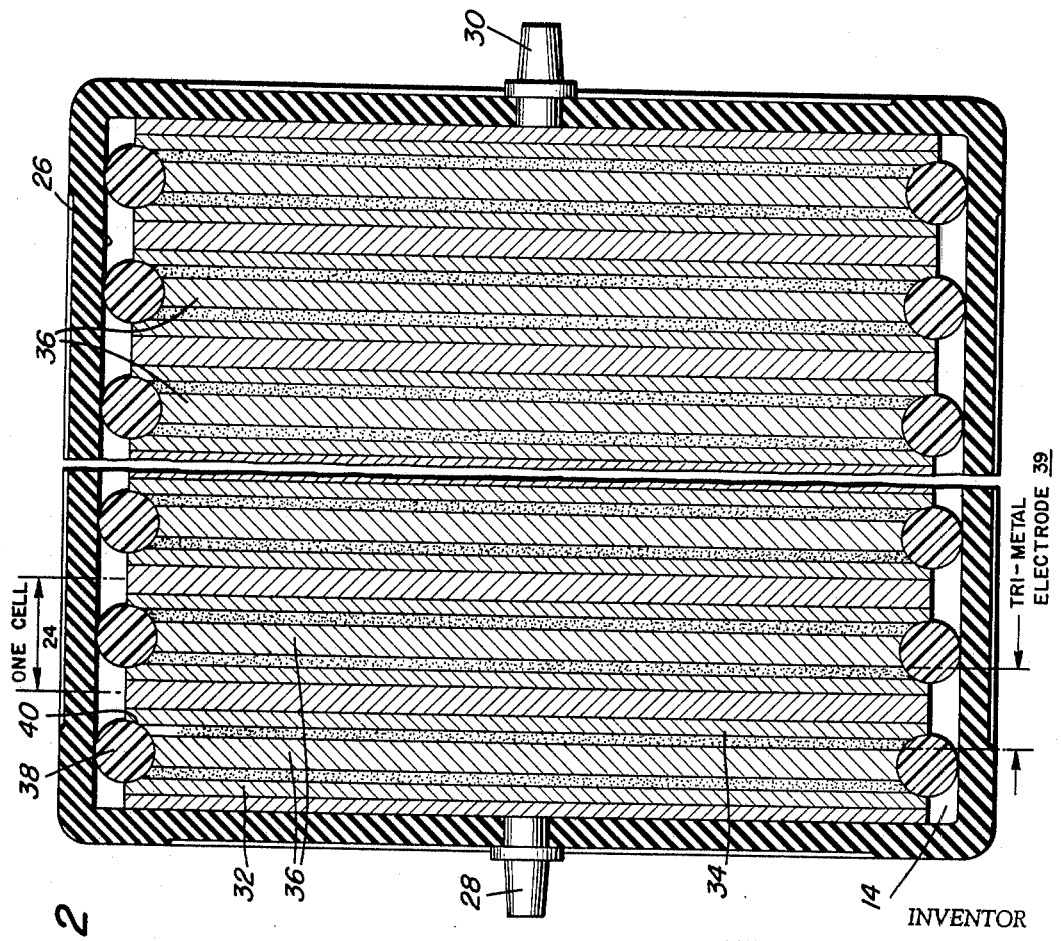
FIG. 2 shows a partial section of the battery power generating cells taken on line 2—2 of FIG. 1, looking in the direction of the arrows.

As is best seen in FIG. 2, each cell section 24 comprises an anodic electrode 32 separated from a cathodic electrode 34 by a spacer 36 of bibulous electrolyte-retaining material, and a sealing ring 38 of any suitable dielectric material mounted in a centrally disposed groove 40 extending around the periphery of the cell to retain electrolyte in spacer 36.

The anodic and cathodic electrodes 32 and 34 are of the same basic structural configuration. Considering first a cathodic electrode, and referring to FIG. 3, it can be seen that the electrode comprises a base layer 42 of highly conductive material and a layer of active cathodic material 44 separated by a layer of cathodic material 46. The layer of cathodic material 46 can be secured to the base layer 42 by welding a bar of the one material to a bar of the other and then rolling to a suitable thickness, e.g., 2 to 5 mils, to form a substrate for mounting the active cathodic material. The rolling process metallically bonds the two layers of metal providing complete electrical contact at interface 48. The active cathodic material layer 44 then is formed by sintering, ionic spraying or pressing cathodic material in a powdered or other suitable form onto cathodic material layer 46 which is preferably prepared by etching or mechanical abrasion. This bounding of active electrochemical material to a substrate surface of the same material precludes the exposure of an electrochemically dissimilar material to electrolyte upon dissipation of the layer of active material. Further, the inherently low electrical resistance of this electrode structure obviates the need for adding highly conductive material to the electrochemically active material as a means of reducing overall resistance. Accordingly, local action is eliminated with the exception of that cause by impurities in the cathodic material. Anodic electrodes are made in the same fashion except that anodic materials such as silver and nickel are used instead of cathodic materials such as zinc or cadmium.

Peripheral grooves 40 may be cut in cell sections 24 after the cell sections have been assembled, or they may be fabricated into the electrodes as at 54 in FIGS. 3 and 4. Grooves 40 are preferably of a depth greater than the thickness of the layer of active material so as to extend into the substrate. This, however, is not critical.

In order to avoid the use of external electrode connecting conductors, all electrodes with the exception of those adjacent casing end walls 16 and 18 are bipolar. Thus, as can be seen in FIGS. 2 and 4, the anodic electrodes 32 and cathodic electrodes 34 of the adjacent cell sections are manufactured as integral structures, the highly conductive base layer 42 being common to the two electrodes.

One method of manufacturing a bipolar electrode of the type shown in FIG. 4 is to weld a bar of anodic material, e.g., silver to one side of a copper bar and a bar of cathodic material, e.g., zinc, to the opposite side of the copper bar. The resulting composite bar is then rolled under pressure to a suitable thickness, e.g., 3–7 mils, although the thickness is not critical. The rolling process causes a complete metallic binding between the layers so as to enable an uninhibited flow of current through what may now be described as a tri-metal substrate having an anodic material layer 50, and a cathodic material layer 46 separated by a highly conductive material layer 42. A layer 52 of active anodic material is then pressed, sintered or otherwise secured to the anodic material layer 50 of the tri-metal substrate. Similarly, a layer 44 of active cathodic material is pressed, sintered or otherwise secured to the cathodic material layer 46 of the tri-metal substrate. Thus for a silver-zinc electrode, powdered silver and powdered zinc would be sintered on silver substrate layer and zinc substrate layer respectively. The thickness to which the active material is applied depends upon the anticipated use of the battery. If it is desired to have lower current levels for relatively long periods of time, heavier layers of active materials should be applied and vice versa.

Various material combinations may be used to form the tri-metal substrate; silver-copper-zinc, nickel-copper-cadmium, lead-steel-lead peroxide, and others. Further, choice of an electrolyte to be used, e.g., KOH or $H_2SO_4$, should be in accordance with the particular active materials chosen, as is well known to those skilled in the art.

The operational advantages of the novel electrode are readily apparent. By securing the active electrode materials to substrate layers of the same material, the incidence of local action losses is reduced to only those caused by possible impurities in the active materials themselves. Further, the complete metallic bonding between the substrate layers allows current to pass directly through the substrate in a direction perpendicular to its major plane thus reducing the length of current travel and also its concentration to an absolute minimum. These reductions in current concentration, current length of travel and local action result in a material reduction in operational internal power losses. Taking advantage of these reductions, weight reductions of 46% and volume reductions of 21% have been realized in the present battery structure as compared to a standard battery.

Obviously many modifications and variations of the present invention are possible in the light of the above teachings. It is therefore to be understood that within the scope of the appended claims the invention may be practiced otherwise than as specifically described.

What is claimed is:
1. A battery comprising:
a casing of dielectric material defining a cell chamber;
at least one electrochemical power cell mounted in said cell chamber, each power cell comprising,
a first electrode having a low electrical resistance material base layer, a cathodic material layer disposed adjacent and bonded to said base layer, and an active cathodic material layer bonded to said cathodic material layer;
a second electrode spaced from said first electrode and having a low resistance material base layer, an anodic material layer disposed adjacent and bonded to said base layer and an active anodic material layer bonded to said anodic material layer;
a spacer of bibulous electrolyte-retaining material disposed in the space between said electrodes and juxtaposed the active cathodic material layer of said first electrode and active anodic material layer of said second electrode;
means for sealing the space between said first and second electrodes to retain electrolyte within said spacer;
an anodic terminal mounted on said casing and electrically connected to said first electrode; and
a cathodic terminal mounted on said casing and electrically connected to said second electrode.
2. The battery of claim 1 further including:
a peripheral groove in said first electrode formed in said active cathodic material layer;
a peripheral groove in said second electrode formed in said active anodic material layer; and wherein
said means for sealing is a member seated in a recess defined by the peripheral grooves in said first and second electrodes.

3. The battery of claim 1 further including:
bipolar electrodes mounted in said cell chamber and disposed between said first and second electrodes whereby to define a plurality of electrochemical power cells; and
spacers of bibulous electrolyte retaining material disposed between each of the electrodes.

4. The battery of claim 2 wherein each of said peripheral grooves is of a depth greater than the thickness of the active material layer.

5. The battery of claim 3 wherein each bipolar electrode comprises a substrate having an active anodic material affixed to one surface and an active cathodic material affixed to the surface opposite said one surface.

6. The battery of claim 5 further including
a peripheral groove formed in the active cathodic material layers of each electrode;
a peripheral groove formed in the active anodic material layers of each electrode; and wherein
said means for sealing is a member seated in a recess defined by the peripheral grooves in said electrodes.

7. The battery of claim 6 wherein each of said peripheral grooves is of a depth greater than the thickness of the active material layer.

References Cited

UNITED STATES PATENTS

| | | | |
|---|---|---|---|
| 543,055 | 7/1895 | Rooney | 136—56 |
| 600,693 | 3/1898 | Julien | 136—31 |
| 2,713,555 | 7/1955 | Neely | 204—286 |
| 2,988,587 | 6/1961 | Haring | 136—111 |
| 3,226,263 | 12/1965 | Oswin | 136—120 |
| 3,404,038 | 10/1968 | Winsel | 136—86 |
| 3,408,230 | 10/1968 | Dickinson | 136—101 |
| 3,003,013 | 10/1961 | Duddy | 136—9 |
| 3,087,003 | 4/1963 | Drengler | 136—10 |
| 3,303,055 | 2/1967 | Salcedo | 136—120 |
| 3,409,473 | 11/1968 | Weber et al. | 136—120 |

FOREIGN PATENTS

| | | |
|---|---|---|
| 998,925 | 7/1965 | Great Britain. |

WINSTON A. DOUGLAS, Primary Examiner

PETER D. ROSENBERG, Assistant Examiner

U.S. Cl. X.R.

136—10, 120, 133, 143; 204—295

PO-1050
(5/69)

UNITED STATES PATENT OFFICE
CERTIFICATE OF CORRECTION

Patent No. 3,484,290      Dated December 16, 1969

Inventor(s) MILTON A. KNIGHT

It is certified that error appears in the above-identified patent and that said Letters Patent are hereby corrected as shown below:

Column 1, line 45, change "Searcing" to --Searching--.

Column 3, line 35, change "bounding" to --bonding--;

line 44, change "cause" to --caused--.

Column 4, Claim 1, line 64, after"to"insert --said base layer of--;

Claim 1, line 66, after"to" insert --said base layer of--.

SIGNED AND
SEALED
JUL 21 1970

(SEAL)
Attest:

Edward M. Fletcher, Jr.
Attesting Officer

WILLIAM E. SCHUYLER, JR.
Commissioner of Patents